March 31, 1936.  G. V. A. MALMROS  2,036,063
PRINTING MECHANISM FOR TABULATING MACHINES
Filed Sept. 8, 1934  2 Sheets-Sheet 2
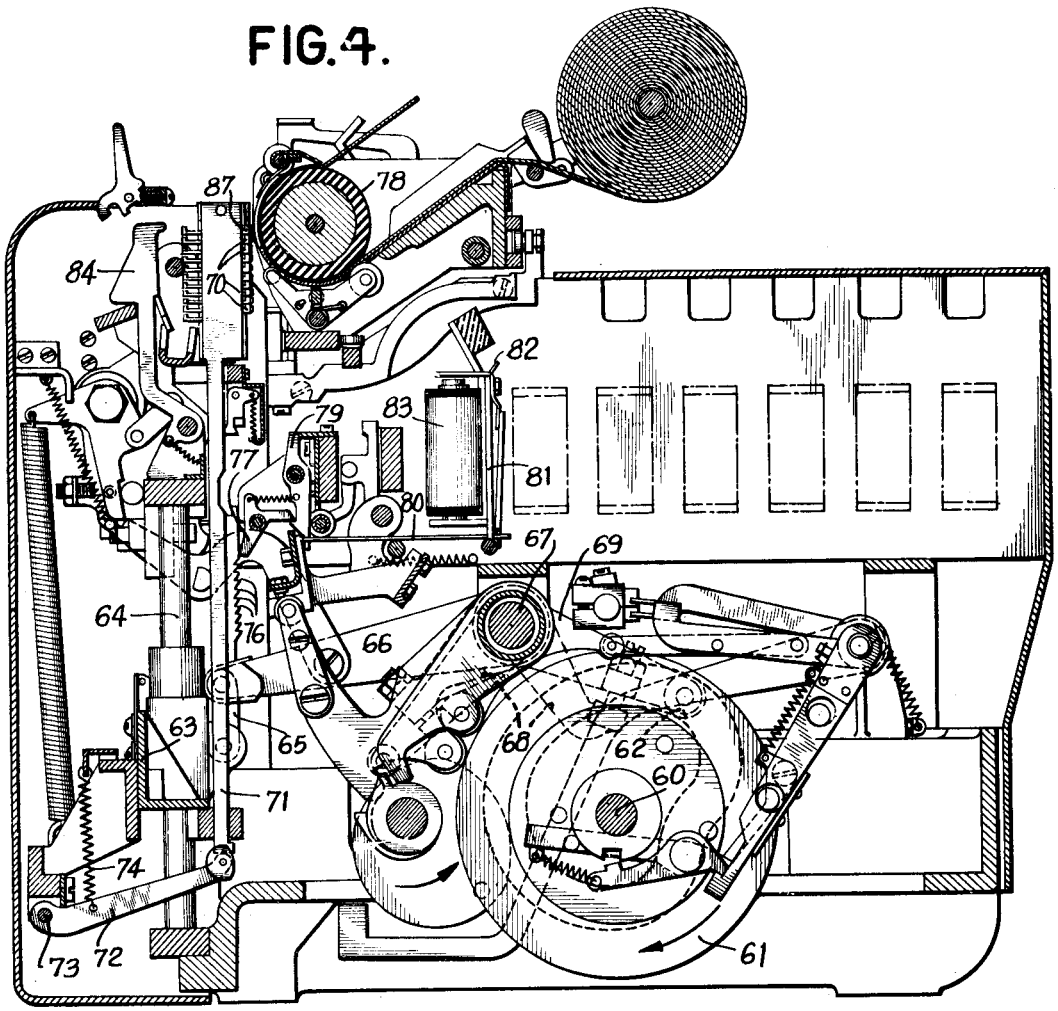
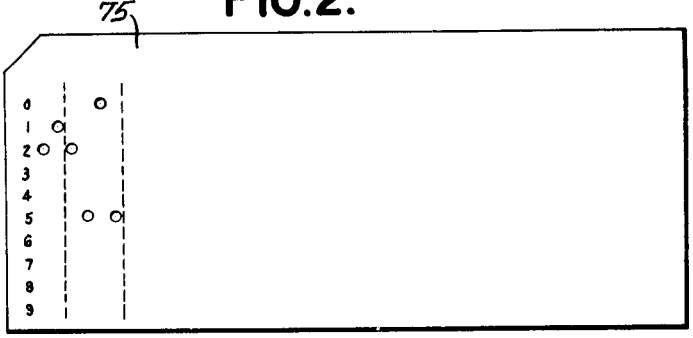
INVENTOR.
Gustav V. A. Malmros
BY
ATTORNEY.

Patented Mar. 31, 1936

2,036,063

UNITED STATES PATENT OFFICE 2,036,063

PRINTING MECHANISM FOR TABULATING MACHINES

Gustav V. A. Malmros, Binghamton, N. Y., assignor to International Business Machines Corporation, New York, N. Y., a corporation of New York Application September 8, 1934, Serial No. 743,248

1 Claim. (Cl. 101—93)

This invention relates to improvements in tabulating and like machines controlled by means of punched records and especially to printing mechanisms therefor.

In recording commercial facts upon records by punching holes therein for use in tabulating machines it is desirable at times to make records in duplicate for a single account, such as a check issued. Each record of a pair represents the same serial number and same amount. When a check is outstanding no duplicate record appears and it is desirable to indicate that fact and the present machine provides for securing such information automatically and expeditiously.

By the provision of the usual amount comparing devices of the tabulating machine and the present invention it is determined whether duplicate records are existent. In such case the second printed or duplicate amount is identified by means of an asterisk. For a check outstanding a single serial number and related amount is printed, the isolation of such indicating that the check is still outstanding.

A further use of the invention deals with the employment of records of only multi-record groups, distinguishing successive records having identity in serial numbers and amounts from successive records indicating a discrepancy in either amounts or serial numbers.

It is an object of the invention to provide for means for comparing successive records to distinguish by printing of a special mark sets of duplicate records each consisting of two, from other records, each of which is a single record group.

Another object of the present invention is to provide means for printing each of the amounts and serial numbers and to characterize the printing of duplicate amounts and serial numbers by printing a special mark.

A still further object of the invention is to provide means for distinguishing identical successive amounts and serial numbers from successive identical serial numbers having non-identical amounts, and to further distinguish when successive serial numbers are non-identical when related amounts are identical.

More specifically it is an object of the invention to provide for automatically printing by a tabulating machine each of the group control numbers and to print a special mark when the duplicate control number is printed.

The invention is shown in one embodiment in the attached drawings in which:

Fig. 2 is a representation of a tabulating card punched to represent a serial number and amount.

Fig. 3 is a representation of a part of record strip which could be printed when the present invention is practiced.

Fig. 4 is a view in section of a printing mechanism of a tabulating machine.

Figure 1:
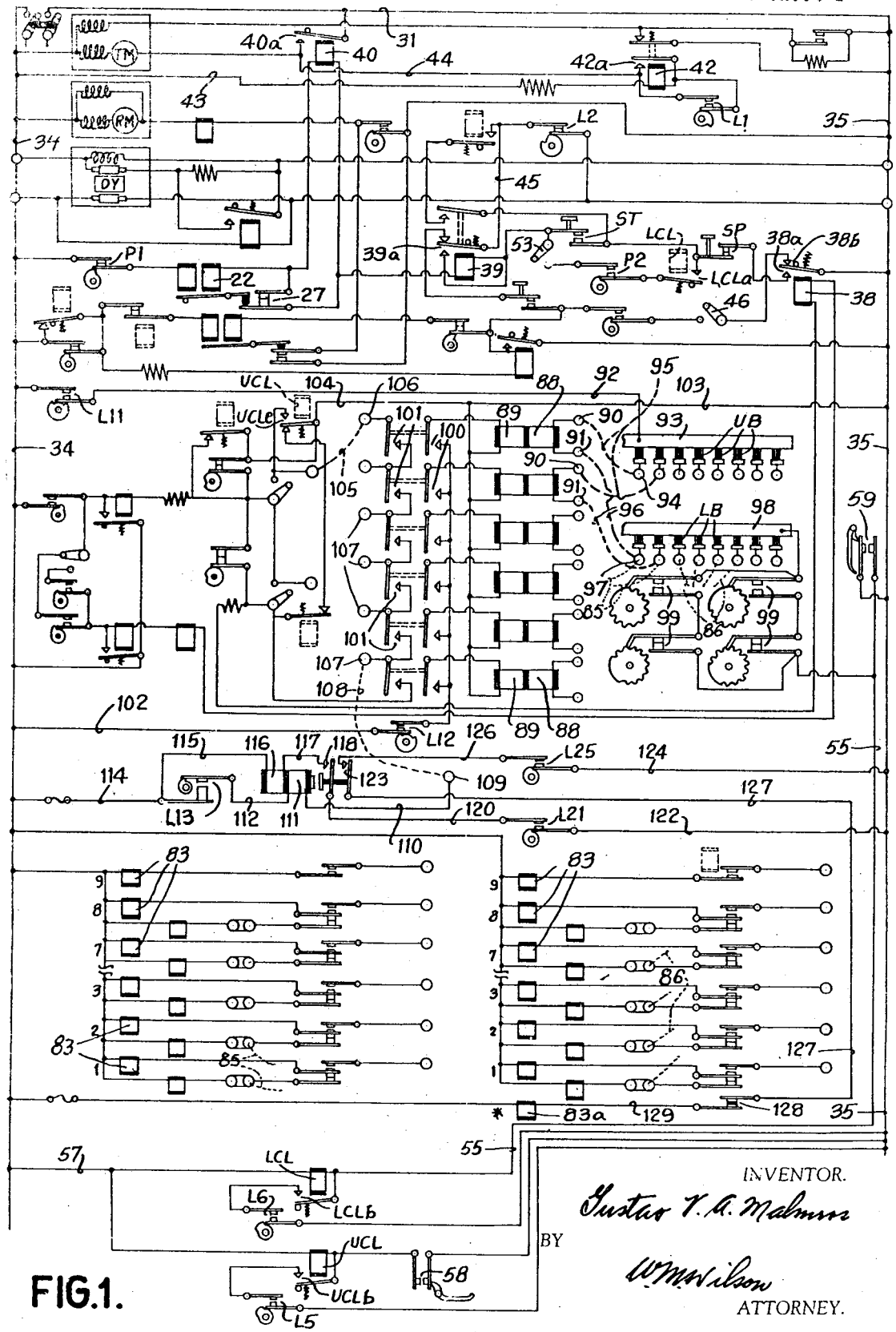
Fig. 1 shows diagrammatically the electrical wiring diagram of a conventional tabulating machine showing the electrical connections for the present improvements.

The electrical circuits of the tabulating machine to which the present improvements are preferably applied are shown in Fig. 1 and a general description of the operation of the machine will be given, certain parts for clearer explanation being given more in detail than subordinate and relatively unimportant mechanisms.

For further explanation of details of construction and operation of the machine to which the present improvements are applied, reference should be had to the patent application of C. D. Lake et al., Ser. No. 672,388, filed May 23, 1933, and now Patent No. 1,976,617 dated October 9, 1934.

In tabulating machines of this class, as more particularly explained in the aforementioned patent, it is customary to send the machine through a reset cycle of operation to insure that the accumulating devices are clear and also to set up the automatic control mechanism forming part of the present invention. Suffice it to say at the present time that during the resetting operation motor control magnet 38 is energized and a holding circuit is provided for maintaining it energized. Contacts 38a of this relay will therefore be closed and contacts 38b open.

*Starting circuit.*—The machine is now ready to start card feeding operations after cards have been placed in the feed magazine usually provided for in tabulating machines. Depression of the start key to close contacts ST will complete a circuit as follows: from line 34, cam contacts P1, tabulating clutch magnet 22, contacts 27, start relay 39, start key contacts ST, stop key contacts SP, contacts 38a (now closed), to line 35. Energization of magnet 22 will cause opening of contacts 27 and the circuit will now include relay magnet 40 which is wired in parallel with the contacts 27. Magnet 40 will close its contacts 40a to complete a circuit through the tabulating motor as follows: from line 34, motor TM, contacts 40a, wire 31, to line 35, thus initiating the operation of the motor. After the motor has operated through a portion of the cycle, cam contacts L1 close momentarily and complete a circuit from the line 34, wire 43, relay magnet 42, contacts L1, wire 44, contacts 40a, to line 35.

The consequent closure of contacts 42a will set up a holding circuit for the magnet 42, traceable from line 34, wire 43, magnet 42, contacts 42a, wire 44, contacts 40a, wire 31 to line 35. Energization of the start relay magnet 39 will effect closure of its contacts 39a to set up a holding circuit for the card feed clutch magnet 22 traceable from the line 34, cam contacts P1, magnet 22, relay 40, magnet 39, contacts 39a, wire 45, cam contacts L2, to line 35. Toward the end of this cycle, cam contacts L2 break and the machine will coast through the remainder of the cycle to home position, which is, as commonly known in the art, termed the "D" position. A second machine cycle is now initiated by depression of the start key to close contacts ST and a second cycle will follow in the same manner as the first. During this second cycle, the first card is advanced to the lower brushes and a second card is fed from the supply magazine to the upper brushes. Following this second cycle, the machine will, as fully described in the aforementioned patent, do one of two things: If the automatic resetting switch 46 is open, the machine will stop; if the automatic resetting switch is closed, the machine will automatically enter upon a resetting cycle of operation, not involved in the present operation.

It has thus been explained that the initiation of operations of the machine require first a resetting operation followed by two successive, manually initiated, tabulating cycles followed by a resetting cycle which may be automatically initiated. At this point, the first card is in readiness to pass and be analyzed by the lower brushes LB and the second card is in readiness to pass and be analyzed by the upper brushes UB and the automatic control mechanism is in readiness to compare the classification data of the cards as they pass through the machine.

Following the reset cycle just explained, the machine will, if automatic start switch 53 is closed, automatically enter upon card feeding and analyzing operations immediately upon completion of the last resetting cycle. This is brought about in the following manner: Relay contacts LCL$_a$ will by a circuit to be presently explained have been closed due to the arrival of the first card at the lower brushes LB and during the reset cycle cam contacts P2 close momentarily at the end of the cycle thereby establishing a circuit from the line 35, contacts 38a, contacts SP, LCL$_a$ and P2, switch 53, start relay magnet 39, contacts 27, tabulating clutch magnet 22, contacts P1, to line 34. The energization of magnet 22 will, as explained above, cause the machine to enter upon a tabulating cycle of operation during which the record cards are successively analyzed and data thereon entered into the recording device. Closure of lower card lever contacts 59 completes a circuit from line 35, contacts 59, wire 55, relay magnet LCL, wire 57, to line 34 to effect closure of contacts LCL$_b$ and the closure of contacts LCL$_a$ mentioned above. Closure of contacts LCL$_b$ will complete a holding circuit for relay LCL through cam contacts L6. This circuit is from line 35, contacts L6, contacts LCL$_b$, magnet LCL, wire 57, to line 34. As long as record cards continue to pass the lower brushes LB magnet LCL will remain continuously energized since contacts L6 are timed to be closed during the interval that the card lever contacts 59 open.

The upper card lever contacts 58 similarly complete a circuit from the line 35, contacts 58, magnet UCL, wire 57, to line 34. Closure of contacts UCL$_b$ sets up a holding circuit through cam contacts L5 whose function and timing are the same as that of contacts L6.

In certain forms of accounting practice it is desirable to determine which of a series of checks are outstanding. To this end for each check two record cards are prepared, each having the same serial number as the check. The two records are punched simultaneously in a punching machine so as to represent identical amounts. In practice when a check is returned, the duplicate punched record is placed next to the other similar punched record, this being effected by usual record sorting operations. For checks still outstanding there will only be one record and therefore only one amount will be printed. The present machine has provisions of means for specially indicating such two card groups by printing an asterisk and for indicating by the lack of printing the special mark when two cards prepared for one check differ in their represented values or amounts, even though their serial numbers are identical, or vice versa.

The above operations are performed by the auto-control mechanism of the machine used in conjunction with the present improvements.

As is well known printing upon the record sheet 30 is performed by a printing mechanism settable under control of the brushes LB which are suitably plugged to control the printer control magnets.

The record cards are punched to represent serial numbers and amounts and by suitable plug connections from the lower brushes printing of this data may be effected on the record strip in two distinct columns, as is observed in Fig. 3.

*Printing mechanism.*—The printing mechanism employed in carrying out the present invention is of a type well known in the art and is shown in Fig. 4. Sufficient explanation will be given herein in order to understand in a general way the manner of the operation of the printing mechanism, but for further details, reference to the aforementioned patent should be had. In Fig. 4, reference character 60 designates the listing shaft of the machine which is driven by the tabulating motor TM when the machine is adjusted to perform listing operations. To the shaft 60 there is secured a listing box cam 61. The cam slot in the box cam is adapted to cooperate with a roller 62. The printing crosshead 63 is mounted for vertical reciprocation on guide rods 64 and is connected by links 65 to arms 66 which are secured to a shaft 67. Shaft 67 has secured thereto a double arm member 68, one arm of which has a mechanical cooperation with a cam follower arm 69 which carries the roller 62. By virtue of this construction, it is apparent that rotation of shaft 60 will reciprocate the crosshead 63 and thereby reciprocate type bars 70 which are carried at the upper ends of type carrying bars 71. The type carrying bars 71 are slidably mounted in the crosshead 63. Their lower ends abut the free ends of arms 72 pivoted at 73 to the crosshead 63 and held in the position shown by springs 74. Thus upward movement of the crosshead 63 will be accompanied by movement in the same direction of the type bars 70 which are slidable horizontally in the type carrying bar 71. The type carrying bars 71 are provided with a plurality of ratchet teeth 76 which cooperate with stopping pawls 77 so that the type bars may be interrupted at various positions to present any of their type elements to the printing platen 78 for printing cooperation therewith.

By virtue of the spring connection 74 the type carrying bars 71 may be interrupted without interfering with the upward movement of the crosshead 63 which has an invariable extent of reciprocation controlled by the listing cam. The stopping pawl 77 is normally held in an inoperative position by a spring-pressed pivoted latch 79 whose lower end is connected by a rod 80 to a bell crank 81 which is pivoted at 82 and whose arm constitutes the armature of a printing magnet 83. Energization of magnet 83 will rock bell crank member 82 in a counterclockwise direction, drawing rod 80 toward the right to unlatch the pawl 77 so that it may swing into engagement with teeth 76 and interrupt the further movement of the type bar 71. The energization of magnet 83 is controlled by the lower brushes LB which, upon sensing the perforation in the record card C, will complete the circuit to the magnet 83 and, due to the synchronization of the type bar travel with the passage of the card by the brushes, will present the type element corresponding to the controlling perforation in printing position.

*Printing hammers.*—The printing hammers 84 which are adapted to strike the ends of the type elements 70 to press them against a suitable inking ribbon, and a record strip surrounding the platen 78, are of a type well known in the art and fully described in the aforementioned patent. It is only necessary for an understanding of the operation of the printing mechanism that after all of the type carrying bars 71 have been differentially displaced and held in their differential positions that the hammers 84 are released for operation to effect the desired printing impression.

As is more clearly shown in Fig. 3, the record card 75 is adapted to be perforated in several card fields, one card field comprising columns 1 and 2 constituting the representation of the serial number. The other card field representing columns 3 to 6, inclusive, are punched to represent the amount of the check. In Fig. 1 there is shown two sets of printing magnets 83 constituting the printing control magnets of two printing banks. By means of plug connections 85 the LB brushes of columns 1 and 2 are plug connected to correlated printing control magnets of one of the printing banks. By means of plug connections 86 the LB brushes of columns 3 to 6 are plug connected to correlated printing control magnets 85 of the other printing bank.

In connection with the printing mechanism adapted to print the amount of the checks, one of the printing units is provided with a special type 87 (Fig. 4) adapted to print an asterisk and an additional magnet 83a (Fig. 1) controls the type bar provided with the asterisk type. As will be later pointed out, the asterisk is only printed as an accompaniment to printing one of two amounts derived from records constituting a multi-record group.

*Automatic control mechanism.*—The automatic control device described in detail in the aforementioned patent is employed in connection with the present improvement to determine whether a pair of record cards analyzed concurrently during the same tabulating machine cycle is identical with respect to their serial numbers and the amounts. This mechanism will now be explained in detail.

A number of double wound relay magnets are provided, each having a pick-up winding 88 and a holding winding 89. Windings 88 terminate in plug sockets 90 and 91 by means of which the pick-up windings may be plug connected in series with the upper brushes UB and the lower brushes LB. Since the index point positions of the card passing the lower brushes LB are analyzed concurrently with the analysis of the corresponding index point positions of the following card passing the upper brushes UB, perforations occurring in corresponding index positions of both cards will complete a circuit to the pick-up winding 88 at a time in the cycle of the operation of the machine corresponding to the location of the perforation.

*Control pick-up circuit.*—In view of the fact that a single double-wound relay magnet is provided for each card column, the pick-up circuit for only one column will be described, it being assumed that brushes UB and LB locate corresponding perforations of a pair of records at the same time. This circuit is traceable as follows: from line 34, cam contacts L11, wire 92, upper brush contact roller 93, one of the upper brushes UB contacting with the roller 93 through a perforation in the record, plug socket 94, plug connection 95, socket 90, winding 88, socket 91, plug connection 96, socket 97, to the brush LB of the corresponding column, through the perforation in the record at the lower brushes, lower contact roller 98, circuit breaking devices 99, lower card lever contacts 59, to the line side 35.

*Control holding circuit.*—The control holding circuit for a single order will now be explained. Energization of the winding 88 will close its contacts 100 and 101, the former setting up a holding circuit for the winding 89 which is traceable as follows: from the line 34, wire 102, cam contacts L12, contact 100 (now closed), winding 89, wire 103 to the line side 35. Contacts L12 hold the windings 89 energized until the end of the cycle and until the mechanism has performed its controlling function. It is thus apparent that the windings 88 are differentially energized in accordance with the value of the controlling perforation and that the windings 89 hold all the stick circuits to keep the contacts 101 closed in all orders in which agreement occurred between the cards.

Since two card columns are devoted to represent serial numbers and four card columns are devoted to represent the amount of the check, six double-wound relay magnets are plug connected to the corresponding card columns of both the upper brushes UB and the lower brushes LB, as shown for two columns in the wiring diagram. Obviously, if there is an agreement in all card columns, the six sets of contacts 101 will be closed after all the index point positions have been analyzed. In the event that there is disagreement in a perforation position of compared card columns, the winding 88 of the corresponding column will not be energized and the corresponding set of contacts 101 will, therefore, be open after the analyzing of the numeral positions of the card has been completed.

*Selective control of printing of asterisk to distinguish single card groups or discrepancies in amounts represented on a pair of cards.*—Taking a concrete example, it will be observed, considering a pair of cards punched to represent the same serial number 21 and the amount 25.05, that such pair of cards is presented concurrently to the upper and lower brushes. With reference to Fig. 3, the amount printed on the first line is printed by the printing mechanism during the second tabulating machine cycle and during this machine cycle the amounts represented on the card controlling the printing mechanism is analyzed and compared concurrently with the amounts represented on the following card, which, in the present example, is a duplicate of the first card. Therefore, it will be observed that since there is an identity in all of their respective amounts all of the double-wound auto control relay magnets 88, 89, will be energized and all of the sets of contacts 101 will be closed. A circuit will then be closed, described as follows: line side 35, wire 103, wire 104, contacts UCL<sub>e</sub>, which are now closed due to the energization of card lever control magnet UCL, a plug connection 105, to socket 106. The circuit then extends through the six sets of contacts 101, serially through such contacts, to a plug socket 107. The circuit then extends by a plug connection 108 to a plug socket 109. The plug connection 108 is varied in accordance with the number of controlling columns and is plugged into the selected socket 107 in accordance with the number of controlling columns. From socket 109 there is a wire connection 110 to a pick-up winding 111 of a matching relay, then by a wire 112, through contacts L13 and wire 114 to the line side 34. Before cam contacts L12 open, the contacts L13 are closed by a cam operated by the listing shaft of the machine, therefore, causing the energization of the pick-up magnet 111 and holding it to nearly the end of the tabulating machine cycle.

Before contacts L12 and L13 open, holding magnet 116 is held energized by a holding circuit to be described as follows: line side 34, wire 114, wire 115, holding magnet 116, wire 117, relay contacts 118 now closed by energization of magnet 111, wire 120, cam controlled contacts L21, wire 122, to line side 35. The cam contacts L21 are closed by a cam on the listing shaft and are adapted to hold the energization of holding circuit relay magnet 116 to keep relay contacts 118 and 123 closed and continue their closure during the succeeding tabulating machine cycle. Contacts L12 and L13 open at the end of the cycle to permit re-energization of pick-up magnet 111 during the cycle of machine operation all the sets of contacts 101 close.

When magnet 111 is energized, relay contacts 123 also close, therefore, closing at this point a circuit now to be described. Line side 35, wire 124, cam controlled contacts L25, wire 126, contacts 123 (now closed) wire 127, contacts 128 (now closed), wire 129, the asterisk printing control magnet 83a and thence to the line side 34. Contacts L25 are closed by a cam on the listing shaft of the machine at a point in the cycle dependent upon the position of the asterisk printing type. If such type is adapted to be presented to the printing line at the "9" index point position contacts L25 are closed at this time. It should be understood that contacts L21 are also closed at this time to continue the closure of contacts 123. Obviously, an impulse will be directed to the asterisk printing control magnet 83a to cause printing of the asterisk during the cycle of machine operation in which the duplicate record card 75 is analyzed. The record strip will therefore be printed as indicated in the upper two lines of Fig. 3.

After the asterisk printing operation, contacts L21 will open and the holding magnet 116 will be deenergized permitting a subsequent energization in the event of identity in a successive pair of records.

During the next cycles of machine operation, the record card bearing the numeral designations, serial number 22 and amount 51.07, will be analyzed but since this does not correspond to the preceding, or following record card, there will be no change in characterizing the amounts upon the third or fourth lines as the record pass the lower brushes. The lack of such characterization along with the printing of a single amount specifies that a certain check is outstanding.

Since there is an original and a duplicate record card bearing serial number 23 and amount 10.00, an asterisk will be printed. Upon further operation of the machine, the machine will analyze, in the example assumed, a pair of record cards bearing the same serial number 24 but differing in their respective amounts, namely, 63.05 and 63.15. In view of the non-identity of the perforations in the tens controlling column of the amount representing field, the corresponding contacts 101 will not be closed. Therefore, the matching relay will not be energized and no asterisk will be printed. The lack of such characterization together with printing of the duplicate serial numbers on successive columns will indicate a lack of identity in the represented amounts of a pair of record cards. Upon such occurrence, the incorrect card will be withdrawn from the stack and a correctly punched card inserted in its place.

The present machine may also be employed to determine whether each pair of records is identical as to both serial numbers and represented amounts or to either serial numbers or amounts alone. In this instance records of single record groups are not employed. The machine will also determine discrepancies in serial numbers when amounts are alike, as shown by the bottom two lines of Fig. 3, and vice versa, as already described. Thus the utility of the machine is not restricted in its employment as a complete combination to print all of the results indicated in Fig. 3.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claim.

What is claimed is:

In an amount printing machine, electrical group control means for concurrently analyzing and comparing amount representing designations on a pair of records, an electrical circuit comprising cam controlled contacts in series with a relay magnet controlling two sets of contacts, said circuit being completed by said cam controlled contacts to energize said relay magnet when said group control means determines in one machine cycle that said records are identical, printing means settable concurrently with the analyzing of designations of one record to control the printing of one amount during one machine cycle, electrical means controlled by one set of contacts of said relay magnet for retaining the energization of said relay magnet during the succeeding machine cycle when the other and duplicate amount is printed by said printing means, a differentially movable printing bar carrying a characterizing type, electrical means for stopping the movement of said bar, and a supplemental electrical circuit for said electrical means closed at one point by the other set of contacts of said relay magnet and completed by cam controlled contacts which are adapted to be closed during the movement of the printing bar and at a point in the machine cycle dependent upon the position of the characterizing type on said bar.

GUSTAV V. A. MALMROS.